United States Patent Office 3,193,985
Patented July 13, 1965

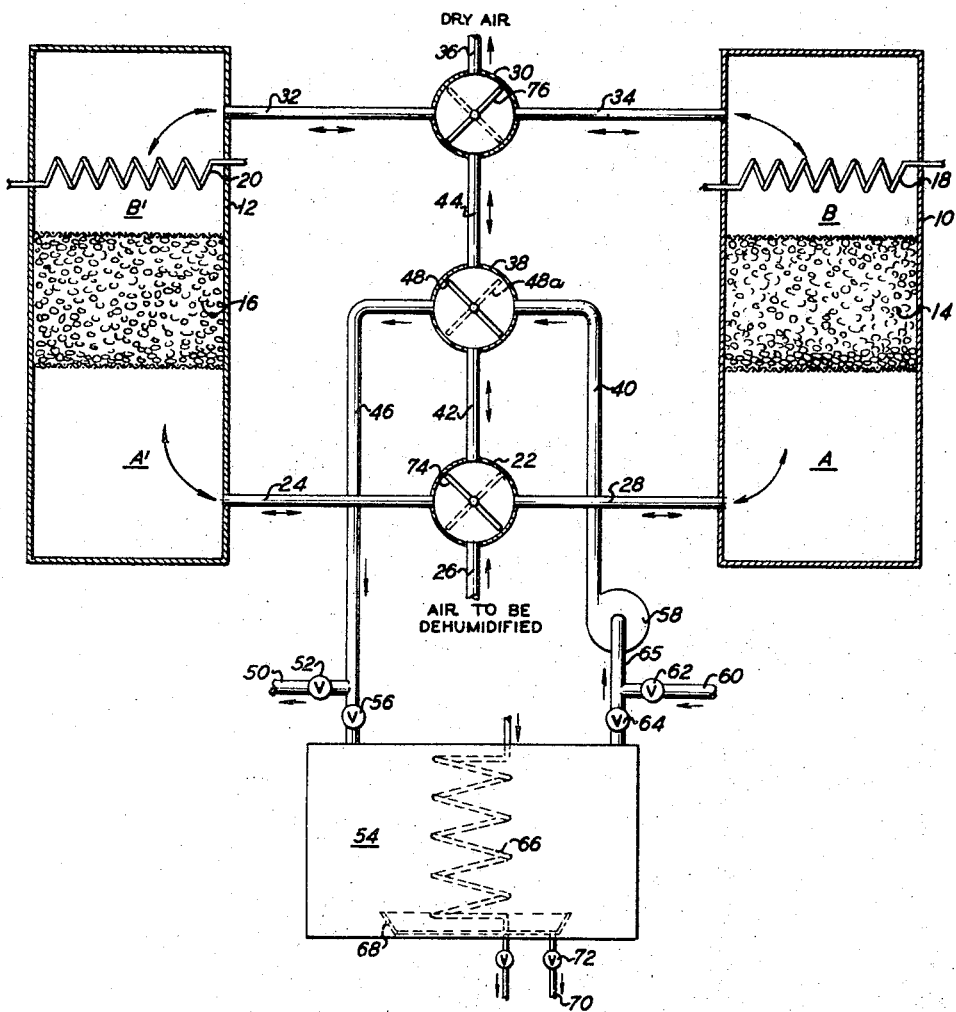

3,193,985
METHOD AND APPARATUS FOR DEHUMIDIFICATION OF GASES
Gert K. A. Siggelin, Falls Church, Va., assignor, by mesne assignments, to Atlantic Research Corporation, a corporation of Virginia
Filed July 11, 1960, Ser. No. 43,268
5 Claims. (Cl. 55—33)

This invention relates to an improved method and apparatus for dehumidifying air to remove moisture or other vapors contained in air or other gases by passing the same alternately through a bed of granular desiccant material, such as silica gel, to remove the moisture or vapor from the gas and then regenerating the bed after a substantial quantity of vapor, such as moisture, is adsorbed by the bed. The invention particularly is directed to an improved bed regenerating system in which the granular desiccant bed, after first regenerating it in a reversed direction of flow of gas therethrough, has regenerating ambient moisture containing gas passed therein, to cool the bed with a flow direction the same as for the dehumidification.

In usual dehumidification of gas the gas is passed through a bed of granular desiccant material and the bed adsorbs moisture from the gas, thereby drying it. The efficiency of the bed to remove moisture from the gas after a substantial amount of moisture has been adsorbed decreases, but the dew point of the dried effluent gas tends to rise progressively as the efficiency of the bed is reduced. Such gas dehumidification is usually carried out in conjunction with a second bed of granular desiccant material which is being regenerated by passing hot scavenging gas through the substantially exhausted bed to remove moisture therefrom.

Moisture adsorbing and regenerating characteristics of such bed of granular desiccant material either on the drying or regenerating cycle varies with the quality of desiccant comprising the bed which has substantial depth, varying from a couple of inches to a couple of feet depending upon the moisture adsorbing capacity desired, it being common to more greatly vary the depth of the bed with lesser variation in the cross-sectional area of the bed to obtain the desired desiccant volume. The gas passes through the bed either from one side to the other or from the bottom to the top, its depth being the linear distance of gas passage therethrough. Inasmuch as the bed does have such considerable depth, the moisture content of the desiccant at the gas influent side of the bed varies considerably with respect to the moisture content of the desiccant at the effluent side of the bed. For instance, on the dehumidification cycle the air to be dehumidified entering the bed at one side tends rapidly to have moisture removed immediately as it enters, and then passes on through the bed depositing progressively less moisture. Accordingly, that bed has more moisture at the influent side which progressively decreases in quantity toward the effluent side, and the effluent side of the bed contains substantially less moisture. The moisture contained in the bed tends ultimately to be redistributed progressively from one side to the other, but when any substantial moisture content becomes contained in the desiccant on the effluent side whereby the emitted gas rises in moisture content, then the bed is ready for regeneration. Similarly, for regeneration of the bed with uneven moisture content of the bed established as just described, it is preferable to introduce the hot scavenging gas from the former effluent side of the bed whereby the hottest gas strikes that portion first, thereby drying it progressively from the effluent side to the inlet side, with respect to the dehumidification cycle. Most efficiently, such bed does not need to be fully dried. Thereby that bed so regenerated in a reverse cycle has its driest portion at least on that side which is effluent or outlet with respect to the dehumidification cycle thereby insuring production of well dried gas at least for a substantial portion of that cycle.

For regeneration of the bed it generally requires less time to effect the moisture removal by passing hot regenerating gas therethrough than it took to exhaust the bed in normal dehumidification of gas because that moisture removal with very hot (300 to 400° F.) scavenging gas is inherently relatively rapid, the rate variable somewhat with the temperature of the gas, so that the moisture laden bed may be regenerated in a comparatively shorter period of time with economic application of heat energy as compared to the period of drying cycle in which the bed becomes exhausted in the normal dehumidification of the gas. For that reason a regenerating cycle is shorter, perhaps two-thirds the period of time being used for regenerating the bed by passage of hot gases therethrough as is required for the practically useful bed life of the dehumidification cycle.

Inasmuch as the bed will not efficiently adsorb moisture on the dehumidification cycle if it is hot; that is, at the high temperature resulting from passing hot gases therethrough in regeneration thereof, it is common to cool the bed by passing cold gas therethrough. Therefore, for balanced time of dehumidification of one bed and simultaneous regeneration of the other, it is common to pass hot gases during regeneration only sufficiently long to remove a practical quantity of moisture in the regeneration thereof by the hot gases; and, after adequately completing regeneration, to then pass cold gas through the bed to cool it to normal dehumidification temperature, ready for the dehumidification cycle. It is most economical that the cold scavenging gas passed through the bed to cool it, however, should contain an ambient quantity of moisture because it is a scavenging gas applied at ambient temperature merely to cool the bed. It is found, however, as the bed cools, it tends to remove ambient moisture from the scavenging gas and in the same reversed cycle in which the gas was passed into the hot bed to regenerate it.

Moreover, while a usual quantity of moisture contained in a scavenging gas passed through the bed to cool it for a relatively short period would not greatly decrease the efficiency with respect to over-all or average moisture adsorbing capacity of the regenerated bed, that moisture content in the reverse cycle bed regeneration tends to deposit and concentrate in the effluent side of the regenerated bed and to increase that moisture content of the bed at the point very highly. Accordingly, when the regenerated bed thus cooled is put on the dehumidification cycle, the gas dried by passing from the inlet side to the outlet side again immediately picks up a substantial quantity of moisture left in the outlet side by the cold regenerating gas.

According to the present invention the bed is regenerated in the reversed cycle by passing hot scavenging gas through the bed in reverse, first from what is the effluent side in normal dehumidification to the influent side, whereby to remove moisture progressively in that manner and thereby make the effluent side the driest, removing only a sufficient quantity of moisture from the bed to make it practically operative. That is, the influent side does not need to be as dry as the effluent side. However, for cooling the ambient bed, the cold moisture containing regenerating gas cycle as passed through the bed is reversed again, so that cold moisture containing cooling gas is passed from the influent side of the bed and emitted from the normal dehumidification effluent side (the normal direction with respect to dehumidification) whereby moisture contained in the cold regenerating gas is deposited at the influent or inlet side (with respect to the direction of gas passed through the bed in the normal drying cycle). In that manner a regenerated bed, according to the present invention, has substantially higher efficiency to produce a dehumidified gas during the dehumidification cycle.

Accordingly, as one aspect of this invention an improved bed regenerating cycle is provided in which hot regenerating gases are passed in reverse through the bed to be regenerated and cooling ambient moisture containing regenerating gas is passed in the normal direction; that is, the dehumidification direction through the bed, thereby greatly improving the regeneration thereof.

Further description of this invention is made with reference to the drawings in which the single figure illustrates diagrammatically and in elevation both the dehumidification apparatus and the dehumidification process.

As shown therein, two cylindrical housings 10 and 12 respectively have beds of desiccant material 14 and 16 centrally supported between upper and lower plenums A and B, and A' and B' respectively. Electrical heater elements 18 and 20 are mounted in each plenum B and B' above the beds.

Typical 4-way valves controlled by a rotating vane for alternately interconnecting the 4-ways of each valve into two pairs, as well known in the art, are mounted to control the flow of gases into, out of and between the dehumidifier housings 10 and 12. For this purpose a lower 4-way valve 22 is mounted for interconnecting lower duct 24 with duct 26 and duct 28 with duct 42 in the full position of the valve vane 74. In this position air to be dehumidified enters through duct 26 and passes to the lower plenum A' of unit 12 through duct 24. Simultaneously, moisture laden scavenging gas leaves plenum A through duct 28 and passes to outlet duct 42 for disposal.

When valve vane 74 is rotated to dotted line position the flow direction is reversed, inlet gas from duct 26 then passing by way of duct 28 to plenum A and scavenging gas from plenum A' is led by way of duct 24 through duct 42. Similarly, an upper 4-way valve 30 of the same type is mounted to control the passage of gas into and out of upper plenum chambers B' and B, the valve vane 76 interconnecting in the full line position shown dehumidified gas in plenum B' with the dry gas outlet 36 by way of duct 32; and interconnecting inlet scavenging gas from duct 44 with the plenum B by way of duct 34. In the dotted line position of the vane 76 the flow is reversed; dehumidified gas then flows out of plenum B through duct 36 by way of duct 34, and scavening gas enters plenum B' from duct 44 by way of duct 32.

Mounted intermediate between lower valve 22 and upper valve 30 is a regenerating gas control valve 38 of the same 4-way type. That valve 38 in the full line position of vane 48 interconnects inlet regeneration gas passing through inlet duct 40, with continuing inlet duct 44, by which the valve 38 communicates with the valve 30 on one side. The valve 38 further interconnects regeneration waste outlet gas passing through duct 46 with duct 42 by which valve 38 communicates with the valve 22.

In the dotted line position of rotor 48a the outlet 46 then interconnects with duct 44 and inlet 40 with duct 42. Thus the valve 38 interconnects the several ducts 42 and 44 serving as inlet or outlet depending on the position of the rotor vane 48, as shown. Since ducts 42 and 44 as inlet and outlet scavenging gas ducts connect with the inlet and outlet ducts of all plenums by way of 4-way valves 30 and 22, the direction of flow of scavenging gas is ultimately flexible to pass to or from either side of either bed.

The outlet duct 46 may communicate with a waste gas disposal duct 50 leading to a waste gas disposal area as controlled by valve 52, valve 56 being closed; or the gas passing through duct 46, valve 52 being closed, may be passed to a refrigerating chamber in a tank 54 as controlled by a valve 56. Similarly, regenerating gas passing through duct 40 as impelled by a fan or blower 58 may enter the system through a duct 60 through which may be provided gas for reactivation of the desiccant beds from any available source, valve 62 in duct 60 being open for this purpose, and valve 64 being closed; or the reactivation gas may be obtained as cold relatively dry recycled gas from refrigerating chamber 54, valve 64 being open for this purpose and valve 62 being closed.

In the refrigerating chamber 54 a refrigerating coil 66 is mounted connected (not shown) to a source of cooling fluid circulated therethrough as shown by the arrows to maintain the surface of refrigerating coil 66 cold, and thereby cool the regenerating gas in contact therewith somewhat in heat exchange. A drip pan 68 is mounted beneath the coil 66 whereby any small amount of condensed moisture passing to the bottom of the coil 66 may be withdrawn from time to time through a duct 70 as controlled by a valve 72.

In the simplest form of construction and operation with the vane 74 of the lower valve 22 in the full line position as shown, and the vane 76 of the upper valve 30 in the full line position as shown, gas, such as air, to be dehumidified first enters the duct 26, usually as forced by a blower (not shown). The gas passes thence by way of duct 24 into plenum chamber A' of the left-hand dehumidifying unit 12, and thence upward through bed 16 wherein its moisture is removed by the adsorbent bed of granular desiccant, such as silica gel. The dried gas then passes into plenum chamber B', heater unit 20 being inactive, and the gas leaves the plenum B' through duct 32, and thence out of duct 36 for disposal as dehumidified dry air.

Simultaneously, the dehumidifier unit 10 is being regenerated. For this purpose, regeneration gas either as ambient moisture-containing gas, which enters through duct 60, valve 62 being open for this purpose and valve 64 closed; or as somewhat cooled gas but still containing some ambient moisture containing gas from refrigeration chamber 54, valve 64 being open for this purpose, and valve 62 closed. In either case the regeneration gas enters into duct 65, passing to blower 58 and thence through duct 40 passing into duct 44. The rotor vane 48 of the valve 38 being in the full line position as shown, the regenerating gas passes by way of valve 30 and duct 34 into plenum chamber B of dehumidifier 10. At the first part of the cycle electrical heater element 18 is activated and heats the gas. The hot regeneration gas passes downward from plenum B into bed 14, picking up moisture from the desiccant material at its raised temperature, passing thence into plenum A. It then passes out of plenum A through duct 28, traversing duct 42 through opposite side of the vane 48 of valve 38 and then out through duct 46. The hot regenerating gas in duct 46 may be disposed of through duct 50, valve 52 being open and valve 56 closed for that purpose; or it may be cooled and recycled.

Assuming the cycles have begun; that is, both dehumidification and regenerating and then continued for a period of about 2 hours, the bed 16 still has considerable capacity to adsorb the moisture, but the bed 14 may then be quite adequately regenerated. Accordingly, it is merely necessary to reverse the vane 48 position of valve 38 to the dotted line position 48a. This will cause the gas passing from duct 40 into 44 and 34 into plenum B to be transferred to pass into duct 42, thereby flowing in reverse through duct 28 and into plenum A of the dehumidifier 10, passing upward through the bed 14 and thence through plenum B and now out through duct 34 and in reversed flow through duct 44, and then out through duct 46 as before.

Simultaneously with the reversal of vane of valve 38 to the vane position 48a, the heating of coil 18 is terminated by terminating the passage of electric current therethrough so that the reactivation air, entering the system either as ordinary ambient moisture-containing air through duct 60 or as recycled air from refrigerated chamber 54, is not heated and therefore cool air is passed through the bed 14 and in the same direction of flow as normal for dehumidification. That is, the same direction of flow as the air passing through the dehumidifier unit 12 operating on the drying cycle. Thus, while dehumidification is continued in unit 12 through bed 16, regeneration of bed 14 with hot air has been discontinued and instead cold moisture-containing air, at least at the temperature of ambient moisture-containing air, is passed into the hot bed 14 to cool it down, but in the normal direction of flow, whereby moisture adsorbed by bed 14 from the cold air tends to concentrate in the area of the bed next to the plenum A. Accordingly, toward the end of the cycle as described, and until bed 16 becomes exhausted, cool moisture containing reactivation gas is passed into unit 14.

When the cycle is to be reversed, that is, dehumidifying unit 10 is to be used for gas dehumidification and dehumidifier 12 is to be regenerated, then the vanes 74 of lower valve 22 and 76 of upper valve 30, are reversed to the dotted line positions, and vane 48 of valve 38 returned to the original full line position as shown, whereby gas to be dehumidified passes from duct 26 through duct 28 and into plenum A, thence upward through bed 14 and out of the system through ducts 34 and 36 as dehumidified gas.

Simultaneously in this cycle dehumidifier 12 is regenerated by passing reactivation gas into duct 40 valve 38 having its vane 48 in the same full line position with regenerating gas then passing by way of ducts 44 and 32 into the plenum chamber B' of dehumidifier 12, and then downward through bed 16 to remove moisture. Heater 20 will be then activated by electrical current passing therethrough to heat the regeneration gas which then passes downward through bed 16. The hot moisture laden regenerating gas leaving bed 16 passes through plenum A' and thence out of the system by way of ducts 24, 42 and 46. Again, after the bed 16 has been sufficiently regenerated by hot gas it is necessary merely again to rotate the vane 48 of valve 38 to the dotted line position 48a as before, and terminate passage of activating current through heater 20, whereby cool ambient moisture containing reactivation gas passing through duct 40 then passes in normal direction of flow, first into plenum chamber A' by way of ducts 42 and 24, cooling the bed 16, and then being removed by way of plenum B' ducts 32, 44 and 46.

Thus, the system may be operated merely by reversing the direction of flow of reactivating gas, first passing hot reactivating gas in reversed direction through the bed to be reactivated until the bed is practically but not absolutely dried and then passing ordinary ambient cold temperature gas in the normal direction through the hot bed after regenerating in order to cool it. In this respect then a system will operate upon this principle using merely extraneous gas at ambient temperature and moisture content for reactivation, and the moisture laden gas, after reactivation, may be disposed of in any convenient waste gas disposal area, whereby reactivation gas can enter the system through line 60 and be disposed of in line 50. An apparatus so constructed will operate in substantial improvement over prior dehumidifiers.

The reactivating gas itself will have some of its moisture content reduced and be a lower temperature but will not be dry gas, when subject to some cooking. The passage of extra cold reactivating gas through the hot bed brings it back to normal dehumidification temperature much more rapidly. Thus, it will be necessary to pass colder moisture laden cooling gas through the bed for a shorter period of time in order to cool it. The freshly regenerated granular absorbent bed will absorb substantially all of the moisture that is present in the cold regenerating, cooling gas.

The regenerating gas is passed through a refrigerating chamber 54 in contact with the cold surface of the heat exchange coil 66 whereby it is cooled and may deposit some but not all of its moisture upon heat exchange coil 66.

Accordingly, the system as shown may be operated without cooling of the regenerating gas or it may be operated with some cooling of the regenerating gas whether it is heated at the early part of the regenerating cycle as well as at the end of the cycle where it is not heated but merely used as a cooling gas; but the system will usually be operated to use ambient moisture containing extraneous gas for cooling of the regenerated bed.

Certain modifications will occur to those skilled in the art according to known constructions and practices in the art and, accordingly, it is intended that the above description be regarded as illustrative and not limiting except as defined in the claims appended hereto.

I claim:

1. The method of regenerating a bed of granular adsorbent material having vapors adsorbed therein by passage of vapor laden gas through the bed, the vapor laden gas normally entering the bed from a first side of the bed and the dried gas leaving from a second opposite side, opposite to said first side, comprising first passing hot moisture containing regenerating gas in a direction reversed with respect to said normal direction of gas passage through said bed in vapor adsorption, the hot regenerating gas entering the said second side and leaving from the said first side in passage through said bed, and then cooling the hot regenerated bed by passing a relatively colder gas containing relatively more moisture than the gas directly passed through said adsorption material in the said normal vapor adsorption direction, the relatively colder regenerating gas entering from the said first side and leaving from the said second side of said bed.

2. In a method of dehumidification of gas by alternate passage through either of two beds of granular desiccant material, drying the gas in passage through one of said beds while regenerating the other bed in alternate gas dehumidification and bed regenerating cycles, the improvement comprising regenerating the moisture laden bed by passage of scavenging gas therethrough at a temperature sufficiently elevated to cause the adsorbed moisture to be evolved from the desiccant, the hot scavenging gas being at maximum temperature at the side at which it enters the bed, the hot scavenging gas being passed through said bed in a direction opposite to the normal gas flow through the bed in gas dehumidification and being disposed of outside of said system as wet gas, then cooling the hot regenerated bed by passing a relatively cold ambient moisture containing gas through said bed in normal gas dehumidification direction of flow through said bed whereby moisture contained in the said cooling gas is adsorbed by said bed in normal gas dehumidification flow and disposing of the cooling gas outside of said system.

3. Means for dehumidifying a gas comprising a bed of granular desiccant material having means for passing gas to be dehumidified therethrough, the raw moisture containing gas entering the bed through a normal inlet side of said bed and being emitted as dehumidified gas from an opposite outlet side of said bed, means for heating gas mounted near the outlet side of said bed, means for regenerating said bed including means for passing regenerating gas in contact with said gas heating means and into said bed, entering the bed through said outlet side, the hot moisture laden regenerating gas leaving the bed through the normal inlet side, means for cooling said bed by passing a relatively cold cooling gas having an ambient moisture content through said bed, entering through the normal inlet and leaving the opposite outlet side of said bed and means for disposing of said cooling gas outside of said system.

4. Means for dehumidifying a gas comprising a bed of granular desiccant material, means for passing moisture containing gas to be dehumidified therethrough, said gas to be dehumidified entering the bed through a normal inlet side and being emitted as dehumidified gas from an opposite outlet side of said bed, means for heating a scavenging gas mounted near the outlet side of said bed, means for passing a scavenging gas first into contact with the said heating means and then the outlet side of said bed, heating and regenerating the bed as it passes therethrough, leaving said bed through the normal inlet side, means for disposing of the hot moisture containing regenerating gas outside of said system, means for passing a moisture containing cooling gas through the bed entering from the normal inlet side of said bed, cooling means communicating with the outlet side of said bed for cooling said cooling gas and means for recycling the cold cooling gas to said inlet side of the bed as cooling gas for the hot regenerated bed.

5. Apparatus as defined in claim 4 wherein said means for cooling the gas is connected to both the outlet and inlet sides of said bed, alternately to cool hot regenerating gas used to remove moisture from the bed and to cool gas used for cooling said bed.

References Cited by the Examiner
UNITED STATES PATENTS

| 2,083,732 | 6/37 | Moore et al. |
| 2,535,902 | 12/50 | Dailey. |
| 2,561,441 | 7/51 | Lou _____ 55—33 X |
| 2,753,950 | 7/56 | Baker et al. |

REUBEN FRIEDMAN, *Primary Examiner.*

HERBERT L. MARTIN, WALTER BERLOWITZ, EUGENE BLANCHARD, *Examiners.*